(12) United States Patent
Wen (10) Patent No.: US 9,827,840 B2
(45) Date of Patent: Nov. 28, 2017

(54) REMOVABLE BATTERY FIXING ASSEMBLY OF ELECTRIC VEHICLE AND FIXING METHOD THEREOF

(71) Applicant: Aleees Eco Ark Co., Ltd., Bade, Taoyuan County (TW)

(72) Inventor: Chung-Wei Wen, Bade (TW)

(73) Assignee: ALEEES ECO ARK (CAYMAN) CO. LTD., Grand Cayman (KY)

( * ) Notice: Subject to any disclaimer, the term of this patent is extended or adjusted under 35 U.S.C. 154(b) by 505 days.

(21) Appl. No.: 14/387,810

(22) PCT Filed: Mar. 27, 2013

(86) PCT No.: PCT/CN2013/073265
§ 371 (c)(1),
(2) Date: Sep. 24, 2014

(87) PCT Pub. No.: WO2013/143460
PCT Pub. Date: Oct. 3, 2013

(65) Prior Publication Data
US 2015/0037625 A1    Feb. 5, 2015

Related U.S. Application Data

(60) Provisional application No. 61/616,045, filed on Mar. 27, 2012.

(51) Int. Cl.
*H01M 2/10* (2006.01)
*B60K 1/04* (2006.01)

(52) U.S. Cl.
CPC ............. *B60K 1/04* (2013.01); *H01M 2/1083* (2013.01); *B60K 2001/0438* (2013.01);
(Continued)

(58) Field of Classification Search
CPC .................................................. H01M 2/1083
See application file for complete search history.

(56) References Cited

U.S. PATENT DOCUMENTS

2012/0018235 A1*   1/2012   O'Quinn ................. B60K 1/04
                                                      180/65.1

FOREIGN PATENT DOCUMENTS

CN           101100184           1/2008
CN           101987613           3/2011
(Continued)

*Primary Examiner* — Sarah A Slifka
*Assistant Examiner* — Brian Ohara
(74) *Attorney, Agent, or Firm* — Kirton McConkie; Evan R. Witt (57) ABSTRACT

A removable battery fixing assembly of an electric vehicle includes a removable battery module and a fixing device installed in the electric vehicle. The removable battery module has a main body with first and second side surfaces. A guiding bar is disposed on the first side surface. The fixing device includes a base, a driving part, a main transmission part, a guiding part, a first stopping part, and a second stopping part. When installing the removable battery module, the guiding bar is aligned with and moved along the guiding part. When moving the removable battery module to a specified position, the driving part drives the main transmission part horizontally, so that the first stopping part is correspondingly rotated to urge against an end part of the guiding bar. Meanwhile, the plural connection elements correspondingly drive the second stopping part to lock the second side surface of the removable battery module.

4 Claims, 7 Drawing Sheets

(52) U.S. Cl.
 CPC ............... *B60K 2001/0455* (2013.01); *B60K 2001/0461* (2013.01); *B60K 2001/0494* (2013.01); *H01M 2220/20* (2013.01); *Y02T 90/124* (2013.01)

(56) References Cited

FOREIGN PATENT DOCUMENTS

| | | |
|---|---|---|
| CN | 102303589 | 1/2012 |
| JP | 11-208287 | 8/1999 |
| JP | 2010-129181 | 6/2010 |
| WO | 2006/118612 | 11/2006 |

\* cited by examiner

REMOVABLE BATTERY FIXING ASSEMBLY OF ELECTRIC VEHICLE AND FIXING METHOD THEREOF

FIELD OF THE INVENTION

The present invention relates to a removable battery fixing assembly, and more particularly to a removable battery fixing assembly of an electric vehicle and a fixing method thereof.

BACKGROUND OF THE INVENTION

Nowadays, with increasing awareness of environmental protection, more and more products are designed in views of power-saving concepts. As the demands on clean and renewable energy are increased, electric vehicles are developed. Generally, an electric vehicle is powered by the built-in battery. For providing enough electric energy to drive the electric vehicle to move, a battery module with plural built-in batteries must be employed. Consequently, the battery module may occupy some space of the electric vehicle. Moreover, for facilitating charging, maintaining or replacing the batteries of the electric vehicle, the battery module is designed to be removable. The removable battery module is widely used in the power supply system of the electric vehicle.

As the volume of the electric vehicle is increased, the battery module with high power for the electric vehicle has large volume and weight. For example, the battery module of an electric rail vehicle, an electric bus or an electric truck is larger and heavier than the battery module of an electric motor coach or an electric scooter. In case that the larger and heavier battery module is installed in the vehicle body, the installation space and the cooling efficacy of the installation space should be taken into consideration. Moreover, it is necessary to securely fix the battery module in the limited space of the vehicle body and easily lock or unlock the battery module. If the battery module is not securely fixed, the battery module with heavy weight is possibly loosened by the gravity or the centrifugal force during the driving period of the electric vehicle. Once the battery module is loosened, the function of the battery module is deteriorated. Furthermore, if the battery module is not securely fixed, the battery module is readily suffered from collision because of the trembling condition. Under this circumstance, the battery module may be damaged or crushed.

Therefore, there is a need of providing an improved removable battery fixing assembly of an electric vehicle and an improved fixing method thereof in order to securely fix the battery module in the limited space of the vehicle body, prevent the battery module from being loosened or collided, maintain the battery module within the vehicle body, and facilitate replacing the batteries of the electric vehicle.

SUMMARY OF THE INVENTION

The present invention provides a removable battery fixing assembly of an electric vehicle in order to securely fix the removable battery module within the electric vehicle and reduce the installation space of the electric vehicle.

The present invention provides a fixing method for fixing a removable battery module of an electric vehicle, in which the removable battery module is easily installed into the electric vehicle by user and the removable battery module is easily locked or unlocked for facilitating replacing the batteries of the electric vehicle.

In accordance with an aspect of the present invention, there is provided a removable battery fixing assembly of an electric vehicle comprising a removable battery module and a fixing device. The removable battery module comprises a main body having a first side surface and a second side surface. The first side surface and the second side surface are located adjacent to each other. At least one guiding bar is disposed on the first side surface. The fixing device is installed in a vehicle body of an electric vehicle. The fixing device includes a base, a driving part, a main transmission part, a guiding part, a first stopping part, and a second stopping part. The driving part is disposed on the base. The main transmission part is connected with the driving part. The guiding part is disposed on the base. The first stopping part is pivotally coupled with the main transmission part. The second stopping part is pivotally coupled with the main transmission part through plural connection elements. For installing the removable battery module in the vehicle body of the electric vehicle, the at least one guiding bar on the first side surface of the removable battery module is aligned with the guiding part and moved along the guiding part. When the removable battery module is moved to a specified position, the main transmission part is driven by the driving part to be moved horizontally, so that the first stopping part is correspondingly rotated to urge against an end part of the guiding bar. When the removable battery module is moved to the specified position, the second stopping part is correspondingly driven by the plural connection elements to lock the second side surface of the removable battery module.

In accordance with another aspect of the present invention, there is provided a fixing method for a removable battery fixing assembly of an electric vehicle. The fixing method includes the following steps. Firstly, a removable battery module is provided. The removable battery module has a first side surface and a second side surface. The first side surface and the second side surface are located adjacent to each other. At least one guiding bar is disposed on the first side surface. Then, the guiding bar of the removable battery module is aligned with a guiding part of the fixing device of an electric vehicle, and the removable battery module is moved along the guiding part of the fixing device to a specified position. Then, a driving part of the fixing device is enabled to drive a main transmission part to be moved horizontally, so that a first stopping part pivotally coupled with the main transmission part is correspondingly rotated to urge against an end part of the guiding bar. While the main transmission part is moved horizontally, a second stopping part is correspondingly rotated to lock the second side surface of the removable battery module, wherein the second stopping part is pivotally coupled with the main transmission part through plural connection elements.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
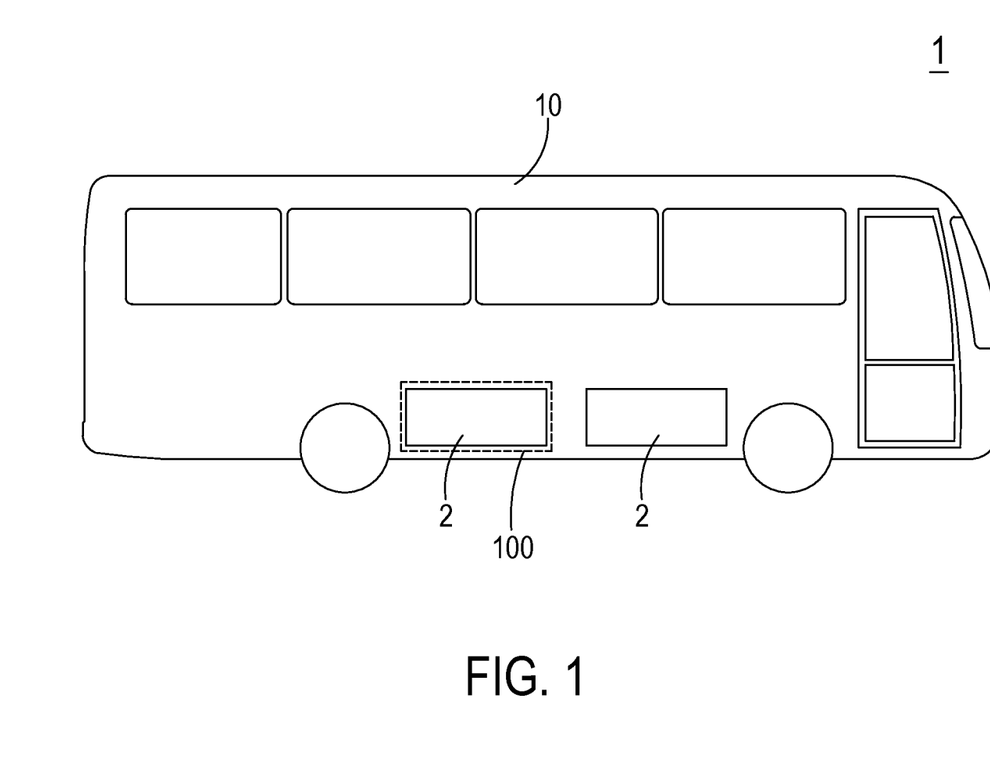
FIG. 1 schematically illustrates an electric vehicle with a removable battery module according to an embodiment of the present invention.
Figure 3:
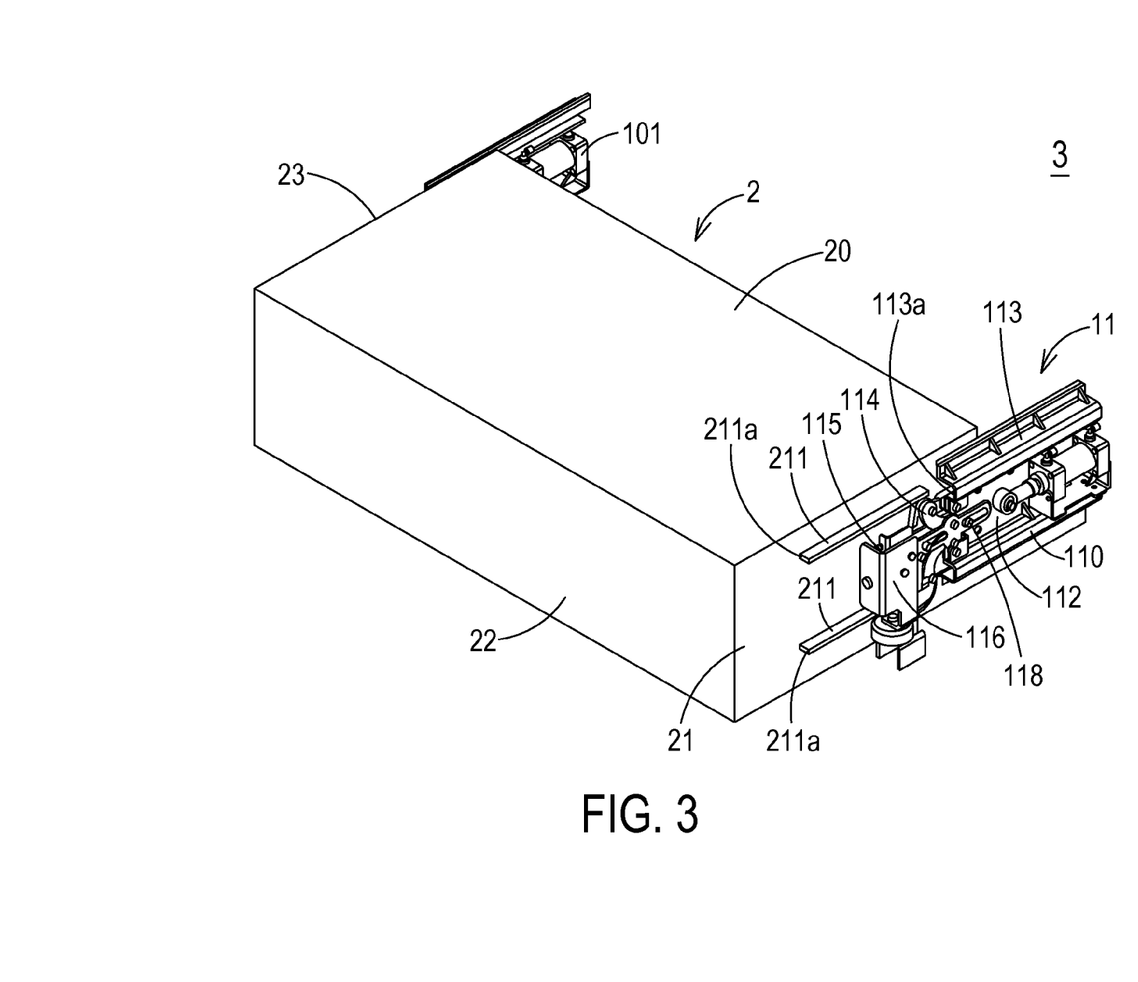
FIG. 3 is a schematic perspective view illustrating the relationship between the removable battery module and a fixing device according to an embodiment of the present invention, in which the fixing device is in an unlocking status.

Please refer to FIG. 1, which schematically illustrates an electric vehicle with a removable battery module according to an embodiment of the present invention. As shown in FIG. 1, the inventive removable battery fixing assembly of the electric vehicle 3 (as shown in FIG. 3) is applied to an electric vehicle 1. The electric vehicle 1 is a large-sized electric vehicle. An example of the electric vehicle 1 includes but is not limited to an electric bus, an electric rail vehicle, or an electric truck. As shown in FIG. 1, the removable battery module 2 is installed in an accommodation space 100 of a vehicle body 10 of the electric vehicle 1. In this embodiment, the electric vehicle 1 comprises one or more removable battery modules 2, which are located at a lateral side of the vehicle body 10 of the electric vehicle 1 or located at two lateral sides of the vehicle body 10. Preferably, the electric vehicle 1 comprises two battery modules 2. It is noted that the number of the battery modules 2 may be varied according to practical requirements.

Figure 2:
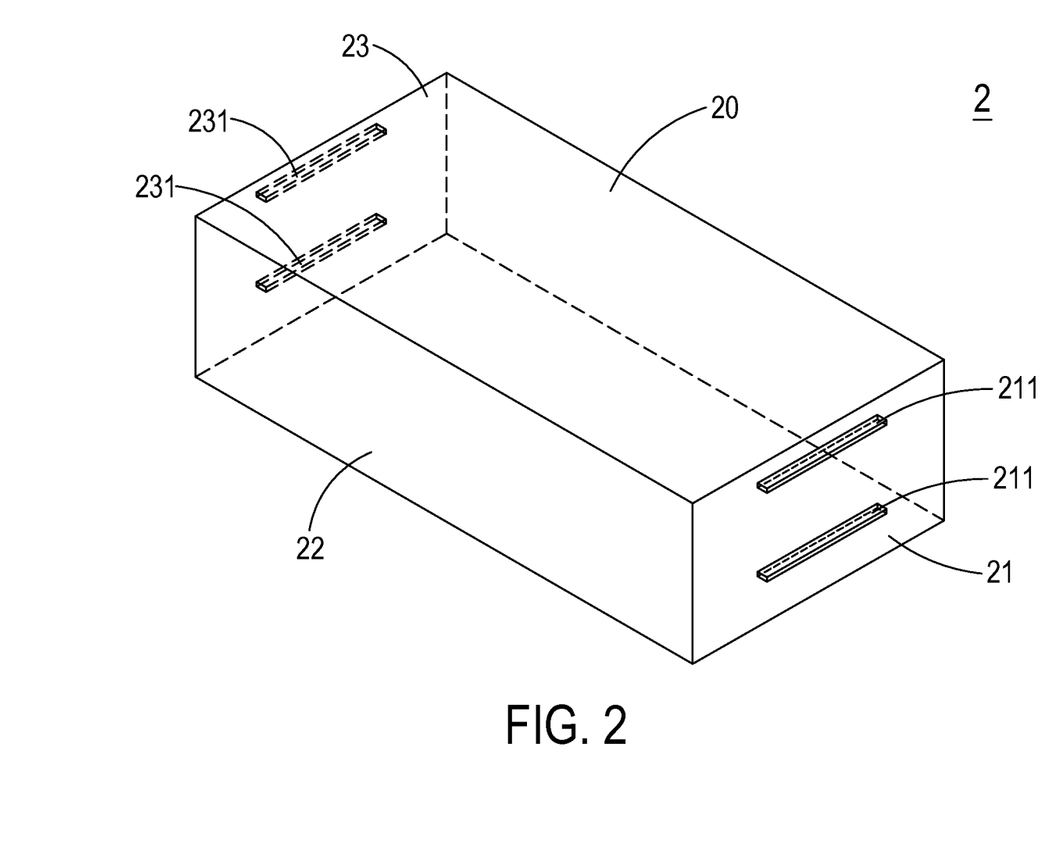
FIG. 2 is a schematic perspective view illustrating the removable battery module of the electric vehicle according to the embodiment of the present invention.

Please refer to FIG. 2, which is a schematic perspective view illustrating the removable battery module of the electric vehicle according to the embodiment of the present invention. As shown in FIG. 2, the removable battery module 2 comprises a main body 20. The main body 20 has a first side surface 21 and a second side surface 22. The first side surface 21 and the second side surface 22 are located adjacent to each other, and at least one guiding bar 211 is disposed on the first side surface 21. In this embodiment, two parallel guiding bars 211 are disposed on the first side surface 21. It is noted that the number of the guiding bars 211 is not restricted. In some embodiments, the main body 20 further comprises a third side surface 23. The third side surface 23 is opposed to the first side surface 21, and at least one guiding bar 231 is disposed on the third side surface 23. The number of the guiding bars 231 is not restricted. The structure and position of the guiding bar 231 are similar to that of the guiding bar 211 disposed on the first side surface 211, and it isn't described redundantly hereinafter.

Figure 4:
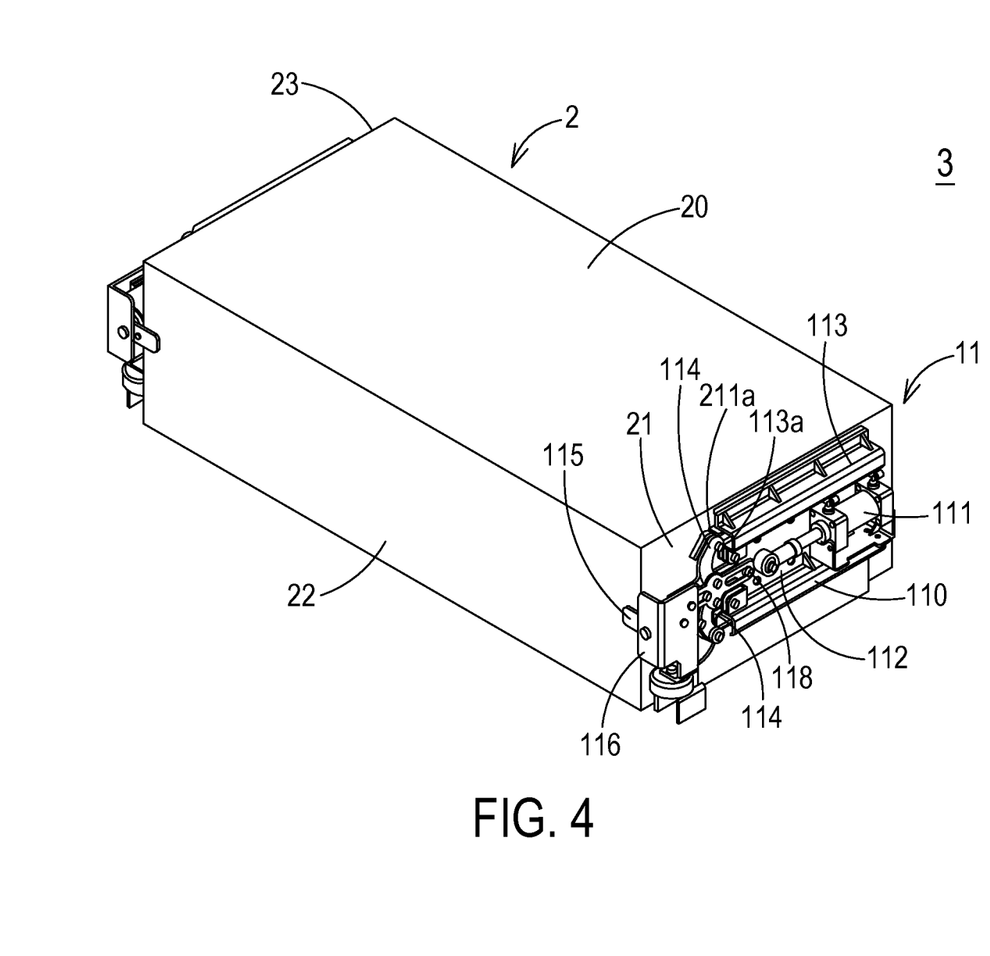
FIG. 4 is a schematic perspective view illustrating the relationship between the removable battery module and the fixing device according to the embodiment of the present invention, in which the fixing device is in a locking status.

Please refer to FIGS. 1, 3 and 4. FIG. 3 is a schematic perspective view illustrating the relationship between the removable battery module and a fixing device according to an embodiment of the present invention, in which the fixing device is in an unlocking status. FIG. 4 is a schematic perspective view illustrating the relationship between the removable battery module and the fixing device according to the embodiment of the present invention, in which the fixing device is in a locking status. As shown in FIGS. 1, 3 and 4, the removable battery fixing assembly of the electric vehicle 3 includes the removable battery module 2 and the fixing device 11. The fixing device 11 is installed in the vehicle body 10 of the electric vehicle 1, and the fixing device 11 is used for fixing the removable battery module 2. In this embodiment, the fixing device 11 comprises a base 110, a driving part 111, a main transmission part 112, at least one guiding part 113, at least one first stopping part 114, and a second stopping part 115. The driving part 111 is disposed on the base 110. The main transmission part 112 is connected with the driving part 111 and performs a horizontal reciprocating movement by the driving of the driving part 111. The guiding part 113 is disposed on the base 110. The guiding part 113 has a guiding groove 113a corresponding to the guiding bar 211 of the removable battery module 2. The first stopping part 114 is pivotally coupled with the main transmission part 112. The second stopping part 115 is pivotally coupled with the main transmission part 112 through plural connection elements. For installing the removable battery module 2 in the accommodation space 100 of the vehicle body 10 of the electric vehicle 1, the guiding bars 211 disposed on the first side surface 21 of the removable battery module 2 are firstly aligned with the guiding parts 113 of the fixing device 11. Then, the removable battery module 2 is pushed to move along the guiding groove 113a of the guiding part 113. When the removable battery module 2 is moved to a specified position (see FIG. 4), the main transmission part 112 is driven by the driving part 111 to be moved horizontally. As the main transmission part 112 is moved horizontally, the first stopping part 114 connected with the main transmission part 112 is forced to rotated and upraised correspondingly so as to urge against an end part 211a of the upper guiding bar 211 (see FIG. 4). At the same time, the second stopping part 115 is correspondingly driven by the plural connection elements to lock the second side surface 22 of the removable battery module 2.

Figure 5:
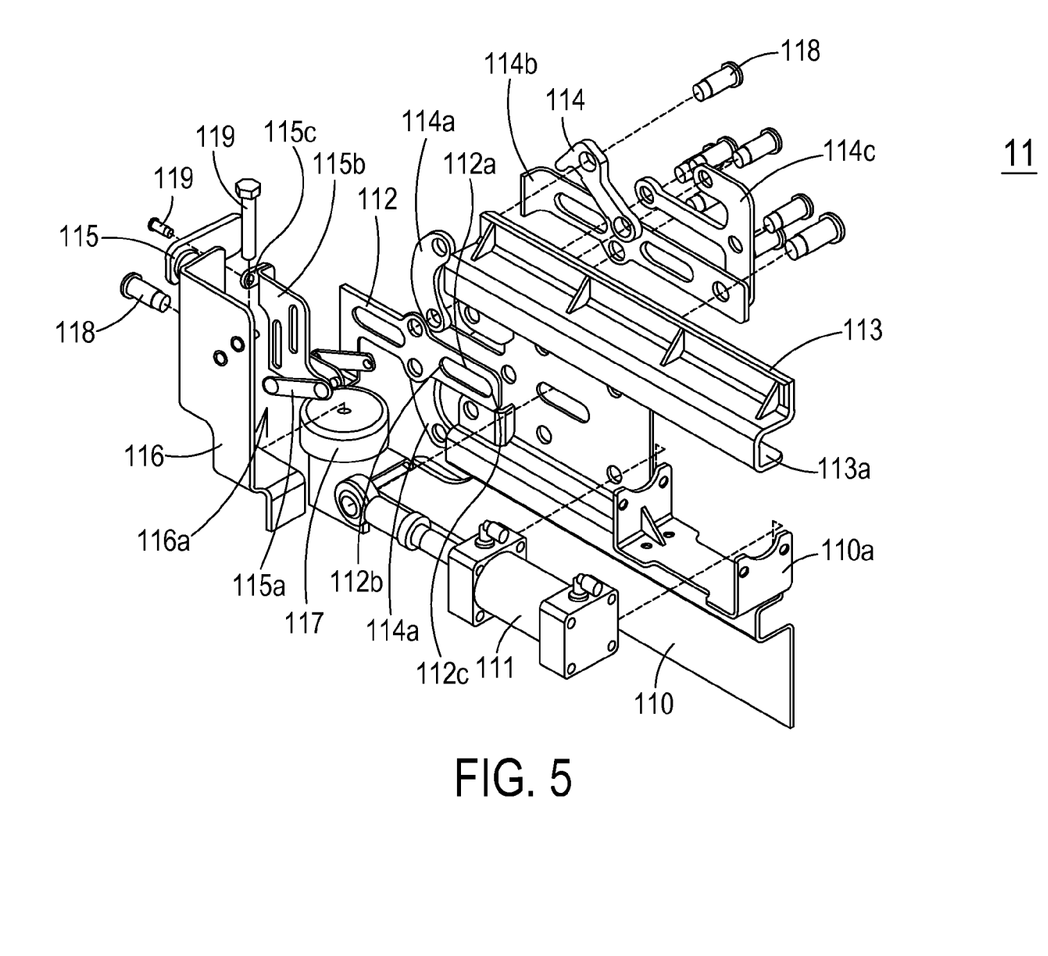
FIG. 5 is a schematic exploded view illustrating the fixing device according to the embodiment of the present invention and taken along a first viewpoint.
Figure 6:
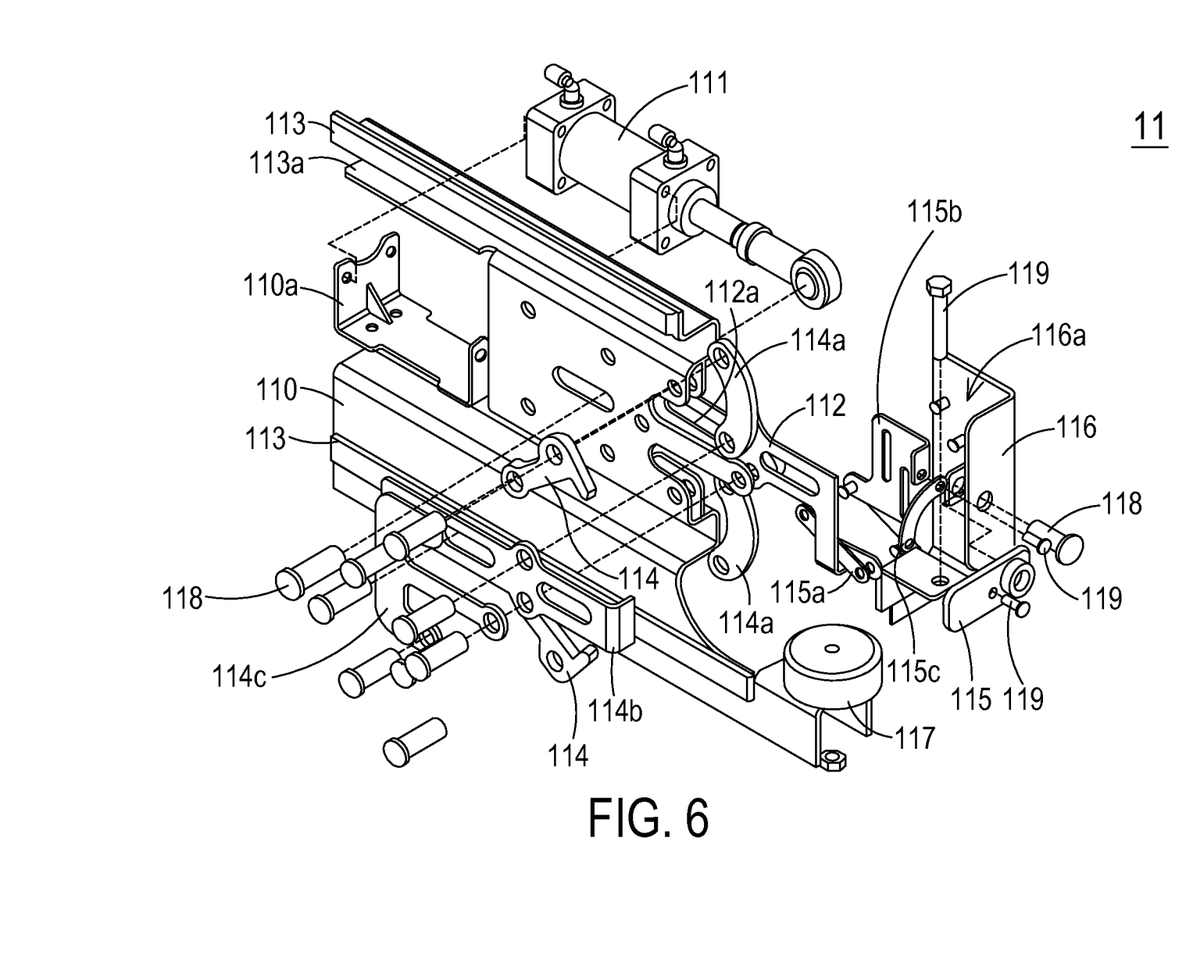
FIG. 6 is a schematic exploded view illustrating the fixing device according to the embodiment of the present invention and taken along a second viewpoint.

Please refer to FIGS. 5 and 6. FIG. 5 is a schematic exploded view illustrating the fixing device according to the embodiment of the present invention and taken along a first viewpoint. FIG. 6 is a schematic exploded view illustrating the fixing device according to the embodiment of the present invention and taken along a second viewpoint. Hereinafter, the detailed configurations and the operations of the fixing device will be illustrated with reference to FIGS. 5 and 6. The base 110 of the fixing device 11 is used to support the other components of the fixing device 11. The base 110 is made of a metallic material, but is not limited thereto. In this embodiment, the base 110 further comprises a bracket 110a for supporting the driving part 111. An example of the driving part 111 includes but is not limited to a hydraulic driving element, an oil pressure driving element, a pneumatic driving element or a screw rod. In this embodiment, the driving part 111 is a pneumatic cylinder. Alternatively, in some other embodiments, the driving part 111 is a stepper motor or any other appropriate driving element that drives reciprocating movement of the main transmission part 112. The guiding part 113 is disposed on the base 110. The guiding part 113 has the guiding groove 113a corresponding to the guiding bar 211 of the removable battery module 2. The guiding bar 211 is movable along the guiding groove 113a of the guiding part 113. In this embodiment, the removable battery module 2 has two guiding bars 211, and the fixing device 11 has two guiding parts 113 corresponding to the two guiding bars 211 of the removable battery module 2. These two guiding parts 113 are located at an upper side and a lower side of the base 110 and corresponding to the two guiding bars 211, respectively. It is noted that the locations and mating structures of the two guiding parts 113 and the two guiding bars 211 may be varied according to practical requirements.

Please refer to FIGS. 5 and 6 again. The main transmission part 112 is connected with the driving part 111. In this embodiment, the main transmission part 112 is a flat plate with a horizontal arm and a vertical arm, but it is not limited thereto. Moreover, in this embodiment, the main transmission part 112 further comprises at least one guiding slot 112a. After a specified fixing pin 118 is penetrated through the base 110 and the guiding slot 112a of the main transmission part 112, the main transmission part 112 is coupled with the base 110. Under this circumstance, the reciprocating moving distance of the main transmission part 112 is limited by the two ends 112b, 112c of the guiding slot 112a. Moreover, according to the position of the fixing pin 118 relative to the guiding slot 112a, a locking status and an unlocking status of the fixing device 11 may be defined. For example, when the guiding slot 112a of the main transmission part 112 is moved and the fixing pin 118 is located at the first end 112b of the guiding slot 112a, the fixing device 11 is in the unlocking status (see FIG. 3). Whereas, when the fixing pin 118 is located at the second end 112c of the guiding slot 112a, the fixing device 11 is in the locking status (see FIG. 4). In this embodiment, the fixing device 11 has plural fixing pins 118 to fix or couple associated components. Moreover, the fixing device 11 further comprises plural fastening elements 119 (e.g. screws or nuts) for assisting in fastening associated components. It is noted that numerous modifications and alterations of the fastening elements and the coupling elements may be made while retaining the teachings of the invention.

When the driving part 111 is operated, the main transmission part 112 connected with the driving part 111 is moved horizontally by the driving of the driving part 111. When the main transmission part 112 is moved and the fixing pin 118 is located at the first end 112b of the guiding slot 112a (i.e. the fixing device 11 is in the unlocking status), the first stopping part 114 connected with the main transmission part 112 is inclined with respect to the main transmission part 112. Namely, the first stopping part 114 is inclined when the fixing device 11 is in the unlocking status. When the main transmission part 112 is moved horizontally by the driving of the driving part 111 and the fixing device 11 is in the locking status, the first stopping part 114 is rotated and ascended correspondingly and further urges against the end part 211a of the guiding bar 211 on the first side surface 21 of the removable battery module 2 (see FIG. 4). Under this circumstance, the first side surface 21 of the removable battery module 2 is locked by the first stopping part 114. In this embodiment, since the first stopping part 114 is pivotally coupled with the main transmission part 112 through plural linking elements 114b-114c, linking arm 114a and plural fixing pins 118, the first stopping part 114 is correspondingly rotated and ascended to urge against and stop the end part 211a of the guiding part 211. Moreover, the removable battery module 2 has two guiding bars 211 disposed on the first side surface 21, and the fixing device 11 comprises two first stopping parts 114 corresponding to the guiding bars 211, but it is not limited thereto. When the fixing device 11 is in the locking status, the upper first stopping part 114 is ascended to urge against and stop the upper guiding bar 211 of the removable battery module 2 and the lower first stopping part 114 is descended to urge against and stop the lower guiding bar 211 of the removable battery module 2. Consequently, the guiding bars 211 disposed on the first side surface 21 of the removable battery module 2 can be securely locked when the fixing device 11 is in the locking status.

Please refer to FIGS. 3, 4, 5 and 6 again. The fixing device 11 further comprises a fixing seat 116 and a guiding wheel 117. In this embodiment, the guiding wheel 117 is disposed under the fixing seat 116. The fixing seat 116 is similar to the base 110. The fixing seat 116 is substantially a plate structure and made of a metallic material. Comparing the fixing seat 116 with the base 110, the bottom of the fixing seat 116 further comprises bent piece. An accommodation space 116a is defined by the inner walls of the fixing seat 116 for accommodating the plural connection elements. Consequently, the installation space of the fixing device 11 is saved. As the main transmission part 112 is moved horizontally toward the fixing seat 116 or away from the fixing seat 116, the plural connection elements are correspondingly moved upwardly or downwardly. For example, the plural connection elements comprises connection arms 115a, 115c and connection piece 115b. An end of the connection arm 115a is pivotally coupled with the vertical arm of the main transmission part 112, and the other end of the connection arm 115a is pivotally coupled with an end of the connection piece 115b. As the main transmission part 112 is moved horizontally back and forth, the connection arm 115a is rotated by an angle, and thus the connection piece 115b is correspondingly ascended or descended. In addition, an end of the connection arm 115c is pivotally coupled with the other end of the connection piece 115b, and the other end of the connection arm 115c is pivotally coupled with the second stopping part 115. As the connection piece 115b is ascended or descended, the connection arm 115c is correspondingly rotated. As the connection arm 115c is rotated, the second stopping part 115 is correspondingly rotated to be in an upright state or a horizontal state. In a case that the fixing device 11 is in the unlocking status (see FIG. 3), the second stopping part 115 is in the upright state, and the second stopping part 115 is completely received within the accommodation space 116a of the fixing seat 116. In case that the main transmission part 112 is moved horizontally by the driving of the driving part 111 and the fixing device 11 is in the locking status (see FIG. 4), the second stopping part 115 is in the horizontal state because the second stopping part 115 is rotated downwardly through the transmission of the plural connection elements (i.e. connection arms 115a, 115c and connection piece 115b). Under this circumstance, the second stopping part 115 is protruded out of the accommodation space 116a of the fixing seat 116. Consequently, the second side surface 22 of the removable battery module 2 is stopped and locked by the second stopping part 115, and a second locking mechanism for the removable battery module 2 is achieved.

Figure 7:
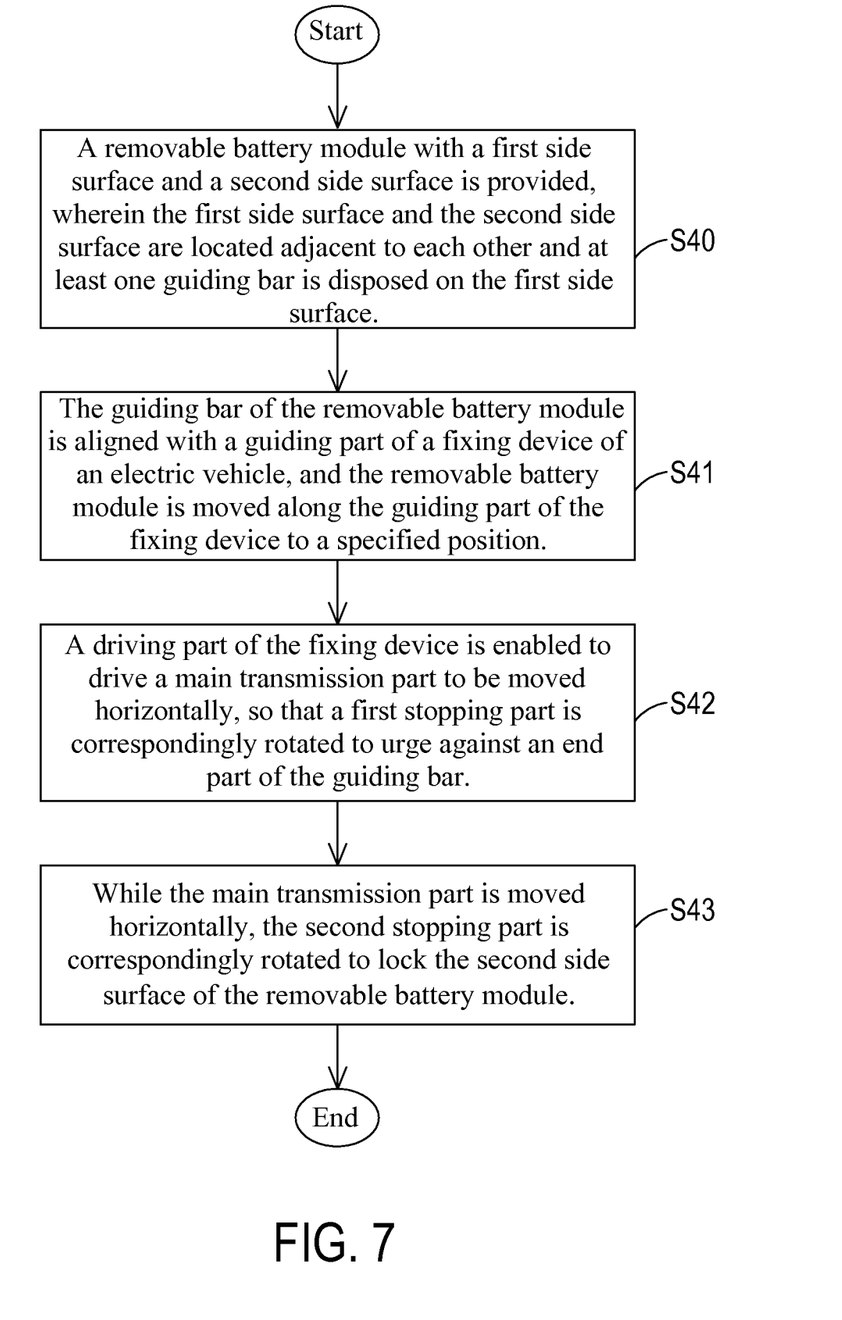
FIG. 7 is a flowchart illustrating a fixing method of fixing a removable battery module on a fixing device according to an embodiment of the present invention.

FIG. 7 is a flowchart illustrating a fixing method of fixing a removable battery module on a fixing device according to an embodiment of the present invention. The locking and unlocking operations of the inventive removable battery fixing assembly of the electric vehicle 3 can be realized by referring to FIG. 7. The fixing method comprises the following steps. Firstly, in a step S40, a removable battery module 2 is provided. The removable battery module 2 has a first side surface 21 and a second side surface 22. The first side surface 21 and the second side surface 22 are located adjacent to each other, and at least one guiding bar 211 is disposed on the first side surface 21. Then, in the step S41 (see FIG. 3), the guiding bar 211 of the removable battery module 2 is aligned with the guiding part 113 of the fixing device 11, and the removable battery module 2 is moved along the guiding part 113 of the fixing device 11 to a specified position. When the removable battery module 2 is moved along the guiding part 113 of the fixing device 11 to the specified position, the guiding bar 211 is received in the guiding part 113. It is noted that the guiding bar 211 is not completely received in the guiding part 113. That is, the end part 211a of the guiding bar 211 is slightly protruded out of the guiding part 113. In the subsequent locking procedure of the fixing device 11, the removable battery module 2 may be further moved to the position corresponding to the locking status of the fixing device 11. After the removable battery module 2 is moved to the specified position, the step S42 is performed. In the step S42 (see FIG. 4), the driving part 111 of the fixing device 11 is enabled to drive the main transmission part 112 connected with the driving part 111 to be moved horizontally back and forth, so that the first stopping part 114 is correspondingly rotated upwardly to urge against and stop the end part 211a of the guiding bar 211 of the removable battery module 2. Meanwhile, in response to the force of rotating the first stopping part 114 upwardly to urge against and stop the end part 211a of the guiding bar 211, the removable battery module 2 is further pulled to the position corresponding to the locking status of the fixing device 11. As mentioned above, the second stopping part 115 of the fixing device 11 is pivotally coupled with the main transmission part 112 through the plural connection elements (i.e. connection arms 115a, 115c and connection piece 115c). As the main transmission part 112 is moved horizontally back and forth, the second stopping part 115 is correspondingly rotated to stop and lock the second side surface 22 of the removable battery module 2. Meanwhile, the locking and fixing operation for the inventive removable battery fixing assembly of the electric vehicle 3 is performed. On the other hand, when the removable battery module 2 needs to be unlocked, an unlocking operation of the fixing device 11 can be achieved by performing inverse actions with respect to the fixing device 11. While the fixing device 11 is in the unlocking status, the removable battery module 2 may be withdrawn from the vehicle body 10 of the electric vehicle 1 easily.

From the above descriptions, the present invention provides a removable battery fixing assembly of the electric vehicle comprising a removable battery module and a fixing device. The fixing device is installed in a vehicle body of the electric vehicle. The fixing device comprises a first stopping part and a second stopping part. The first stopping part is used for urging against and stopping a first side surface of the removable battery module. The second stopping part is used for stopping and locking a second side surface of the removable battery module. Due to the two locking mechanisms, the removable battery module can be securely fixed in the vehicle body of the electric vehicle. Moreover, when the removable battery module needs to be withdrawn, the removable battery module can be unlocked by performing inverse actions with respect to the fixing device. While the fixing device is in the unlocking status, the removable battery module may be withdrawn from the vehicle body of the electric vehicle and replaced with a new one easily. Since the first side surface and the second side surface of the removable battery module are stopped and locked by two locking mechanisms, the removable battery module is securely fixed in the vehicle body of the electric vehicle and the possibility of causing short-contact and damage of the removable battery module from the vibrating and trembling condition when the electric vehicle is operated will be minimized. Moreover, due to the configuration of the fixing device, the installation space for accommodating and fixing the removable battery module is largely saved. Moreover, the locking and unlocking operations of the fixing device can be performed easily, so that the removable battery module can be installed into and withdrawn from the vehicle body of the electric vehicle by the user easily. The inventive removable battery fixing assembly of the electric vehicle has above-mentioned advantages, which is absent in the prior arts. The inventive removable battery fixing assembly of the electric vehicle is valuable in industry.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A removable battery fixing assembly of an electric vehicle, comprising:
   a removable battery module comprising:
   a main body having a first side surface and a second side surface, wherein the first side surface and the second side surface is located adjacent to each other, and at least one guiding bar is disposed on the first side surface; and
   a fixing device installed in a vehicle body of an electric vehicle and comprising:
   a base;
   a driving part disposed on the base;
   a main transmission part connected with the driving part;
   a guiding part disposed on the base;
   a first stopping part pivotally coupled with the main transmission part; and
   a second stopping part pivotally coupled with the main transmission part through plural connection elements,
   wherein for installing the removable battery module in the vehicle body of the electric vehicle, the at least one guiding bar on the first side surface of the removable battery module is aligned with the guiding part and moved along the guiding part, wherein when the removable battery module is moved to a specified position, the main transmission part is driven by the driving part to be moved horizontally, so that the first stopping part is correspondingly rotated to urge against an end part of the guiding bar, wherein when the removable battery module is moved to the specified position, the second stopping part is correspondingly driven by the plural connection elements to lock the second side surface of the removable battery module, wherein the main transmission part further comprises a guiding slot, and the main transmission part is coupled with the base by penetrating a fixing pin through the guiding slot, wherein a reciprocating moving distance of the main transmission part is limited by a first end and a second end of the guiding slot and a locking status and an unlocking status of the fixing device are defined according to a position of the fixing pin relative to the first end and the second end of the guiding slot, and when the fixing device is in the unlocking status, the first stopping part is inclined with respect to the main transmission part, wherein when the main transmission part is driven by the driving part to be moved horizontally and the fixing device is in the locking status, the first stopping part is rotated and upraised to urge against the end part of the guiding bar on the first side surface of the removable battery module, so that the removable battery module is locked by the first stopping part.

2. The removable battery fixing assembly of the electric vehicle according to claim 1, wherein when the fixing device is in the unlocking status, the second stopping part is in an upright state, wherein when the main transmission part is driven by the driving part to be moved horizontally and the fixing device is in the locking status, the second stopping part is rotated downwardly through the transmission of the plural connection elements and the second stopping part is in a horizontal state to lock the second side surface of the removable battery module, so that a second locking mechanism for the removable battery module is performed.

3. The removable battery fixing assembly of the electric vehicle according to claim 1, wherein the driving part is a hydraulic driving element, an oil pressure driving element, a pneumatic driving element or a screw rod.

4. The removable battery fixing assembly of the electric vehicle according to claim 1, wherein the driving part is a pneumatic cylinder.

* * * * *